Oct. 9, 1951     B. E. WILLIAMS ET AL     2,570,415
REFRIGERATED TRANSIT VAN

Filed Feb. 11, 1949     2 Sheets-Sheet 2

INVENTORS.
Beverly E. Williams.
Allan R. Redrow.
BY R. G. Story
ATTORNEY

Patented Oct. 9, 1951

2,570,415

UNITED STATES PATENT OFFICE 2,570,415

REFRIGERATED TRANSIT VAN

Beverly E. Williams and Allan R. Redrow, Chicago, Ill., assignors to Swift & Company, Chicago, Ill., a corporation of Illinois Application February 11, 1949, Serial No. 75,914

7 Claims. (Cl. 62—95)

This invention relates to a method and means for transporting perishable products to distant points, and more particularly to a portable van system for use with airplanes, which van is adapted to be refrigerated by the low temperatures of the upper atmosphere.

It is an object of this invention to provide an improved method for freezing and storing perishable products in transit.

It is another object of this invention to provide an improved method and means for controlling the storage temperature of perishable products in air transit.

It is another object of this invention to provide an improved method and means for air-shipping, refrigerating and storing perishable products.

It is another object of this invention to provide an improved method and means for air-shipping, refrigerating and storing perishable products in an insulated structure.

Other objects will appear from the specification below.

The recent development of the frozen food industry requires new techniques for the transportation and distribution of such product. One development in this field for aiding the distribution of these and other perishable products along the railroad lines of the country is shown in my patent for Refrigerator Car and Method of Using, Number 2,381,796, August 7, 1945. In this prior invention, a structure is provided wherein a hollow wall having flow channels for a refrigerant surrounds the entire storage space of a transport means to effect proper cooling of the stored product. After the product has been properly chilled, the hollow wall structure may be vacuumized to minimize heat conduction through the wall whereby to maintain proper storage temperatures within the chamber.

The present invention is an improvement on this basic development and provides a van structure which may be used for the transportation of perishables that must be refrigerated during storage. The van structure here shown is particularly adapted for use in air transport and is designed to take advantage of the cold atmosphere found at higher altitudes to effect cooling and, if desired, the freezing of the products stored in the van. This invention makes use of some of the original features disclosed in my earlier refrigerator car patent but is particularly adapted for mounting in the fuselage of an airplane, and in addition includes a chambered wall structure which is adapted to be filled with an eutectic solution which can be frozen at the temperatures normally encountered in flight. After being frozen throughout, the eutectic may be used to provide refrigeration when the particular trip is ended. The eutectic solution which surrounds the storage chamber serves the further function of evening out the temperature in the storage chamber by preventing the extremely cold temperature of the higher atmosphere from being directed immediately against the walls of the storage chamber. As is well known, the freezing of an eutectic solution is accomplished at a constant temperature, and thus a desired eutectic solution can be selected to produce the optimum temperature in the storage chamber for protection of the perishable product.

The van structure of this invention provides means whereby the cold higher atmosphere may be used as long as desired to effect proper refrigeration of the stored product, and thereafter this cooling effect can be cut off and the storage chamber efficiently insulated against undue cooling after the desired storage conditions have been established.

Figure 1:
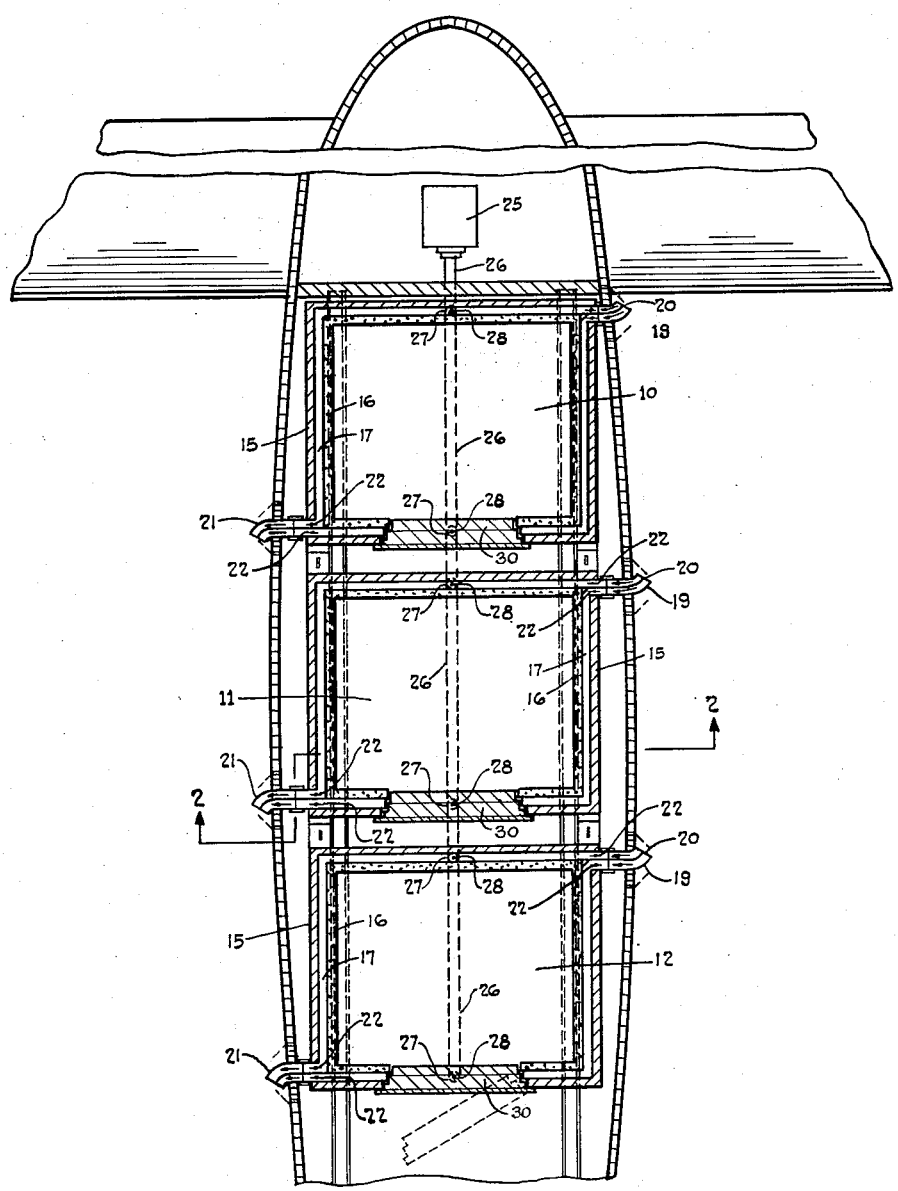
Figure 1 is a plan view, partly broken away, of an airplane fuselage showing the mounting of a plurality of the van structures of this invention in a plane during use.
Figure 2:
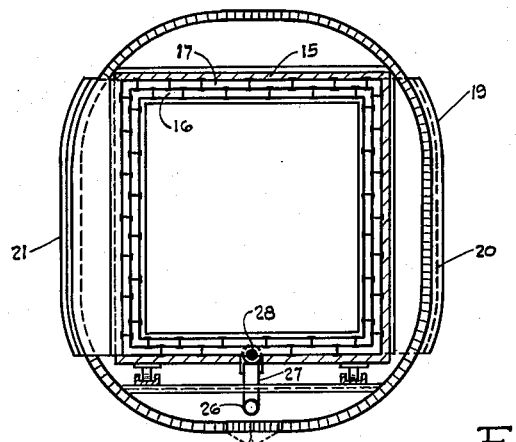
Figure 2 is a sectional view taken on line 2—2 of Figure 1.

The preferred form of a van structure for accomplishing all of these desirable ends as shown in the drawings, and referring more particularly to Figure 1, it will be seen that a plurality of individual van elements 10, 11, and 12 are provided which may be fitted conveniently into the fuselage of an airplane. Each of these van structures is provided with an outer insulated layer 15 and an inner hollow wall structure 16. Between the two wall sections 15 and 16, airflow passages 17 are provided so that air from the higher altitudes may be circulated around the outer surface of wall section 16. The wall section 16 is divided into suitable channels for receiving an eutectic solution, and the storage compartment thus formed within the van is of a size to hold a large quantity of perishable product.

The air flow passages 17 which surround the hollow wall sections 16 of each of the individual vans are adapted to cooperate with the several pairs of air scoops 19 and 20 mounted preferably along the side of the airplane fuselage, and thus, as the plane progresses forwardly, a blast of frigid air is forced around all sides of the eutectic-containing wall sections 16 of the several vans. Also, scoops 21 turned in the opposite direction may be provided at the outlet ends of air flow passages 17, the scoops 21 being shaped to create a low pressure zone at the end of these passages due to the suction of the plane, in order to encourage suitable air flow in passages 17.

Figure 3:
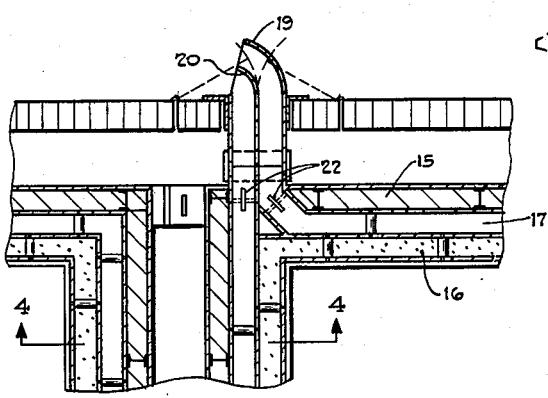
Figure 3 is a detail sectional view showing the structure of the air-scoop intake.
Figure 3:
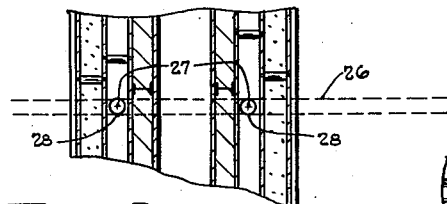
Figure 4:
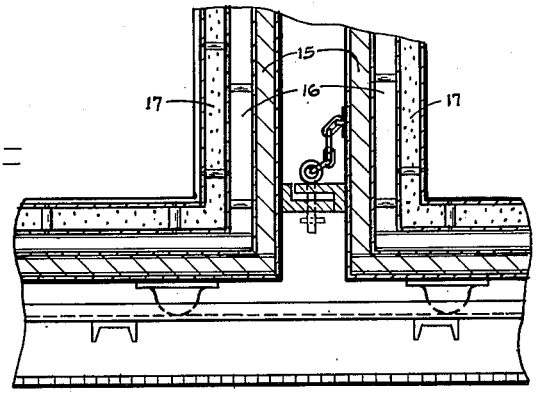
Figure 4 is a sectional view taken on line 4—4 of Figure 3.

As shown more particularly in Figure 3, the inlet to each of the air flow passages 17 is controlled by a valve 22, which may be moved to the dotted line position to close off the air flow after the eutectic solution contained in wall elements 16 has been frozen solid. Each of the valves 22 may be operated by the pilot, and similar valves are positioned at the outlet end of each of the air flow passages 17.

After the plane has been in flight for a sufficient time period to accomplish the freezing of the eutectic solution and to cool all of the perishable product to the desired temperature, the valves 22 may be closed and the air flow passages 17 may be connected to a vacuum-producing means 25. Such connection is made through a pipe 26 having a connection 27 with each of the air flow passages 17. A valve 28 is mounted at this connection, and after the air passages 17 have been sealed by valves 22 located at the air inlet and outlet ends of the air flow passages, the valves 28 are opened and a relatively high degree of vacuum is produced in the air flow passages to establish an insulating layer surrounding the frozen eutectic contained in wall section 16.

The van structures described above may be removably fitted into the fuselage of an airplane after being loaded with a perishable product, and as soon as the airplane can be driven to the higher altitudes, the air circulation around the eutectic-containing wall sections 16 can be established. As the cold air circulates over the eutectic, the temperature of the solution is lowered to its freezing point and heat is simultaneously extracted from the perishable product contained in the storage chamber and the eutectic solution. As long as heat is flowing from the product stored in the van, the eutectic solution cannot freeze and the temperature of the wall section 16, which surrounds the storage chamber, is maintained uniformly at the freezing point of the eutectic. As the heat flow from the stored product diminishes, the eutectic begins to freeze, and after a stable temperature is produced in the storage chambers, the eutectic solution becomes frozen. Thereafter the flow of cold air through the passages 17 should be discontinued as in some cases, the stored product may be damaged by unduly low temperatures.

After the air flow has been cut off, the vacuum-producing means 25 may be connected to passages 17 of the van structures and a vacuum drawn therein to increase the heat insulating properties of the walls of the storage chambers. The insulating effect of the vacuumized air passages together with the wall sections 15 of each of the vans, are proportioned so that effective insulation is provided to prevent any damage to the stored product.

After the airplane has reached its destination, the vacuum means may be shut off and the air flow passages 17 sealed off by their respective valves 28 to preserve the vacuum established therein. Thereafter the vans may be removed from the plane and delivered to their various destinations. In normal use the individual vans would then be emptied and the perishable product would be protected during the usual unloading by the frozen eutectic in the wall sections 16. As the eutectic solution melts, it, of course, maintains its uniform temperature so that a refrigerating effect is provided for a considerable length of time. The melting of the eutectic, coupled with the insulation provided by the vacuumization of air flow passages 17 and wall sections 15, provides a most efficient refrigerated storage van structure.

In the instance where a product must be stored in the individual vans for some time, as at a transfer terminal, the air flow passages 17 may be connected to a suitable refrigerant supply and cold air or other refrigerant circulated around the wall section 16 to maintain proper storage temperatures in the vans. If the eutectic solution has melted, the refrigerant may be circulated merely to maintain the temperature, or, if necessary, the eutectic may be refrozen.

When the refrigerated van structure reaches its destination, the perishable product may be unloaded through a door 30 provided in a side wall. The door 30 should be constructed to fit into the wall of the van so that it does not interfere with the air flowing through any of the air flow passages 17, and preferably the door has a composite structure so that it fits into the wall structure to form a continuation of the air flow passages, the eutectic containing section, and wall section 15, when in its closed position.

The interior wall section 16, which contains the eutectic solution, may be provided with suitable drain connections for filling the wall with any desired eutectic composition to produce any selected temperature in a given van upon the freezing of the eutectic. This wall section 16 may be supported with the insulated wall element 15 by any suitable spacer means which do not interfere with the flow of air through passages 17.

Clamping means may be provided for fixedly holding the van in the airplane fuselage during flight. These means may also be used to hold the van on other intermediate transporting means, such as trucks, or a railroad car, which may be used to forward the van on its trip from the source of the perishable product to the retail outlet.

An important feature of the van structure of this invention is concerned with the wall section 16 for holding the eutectic solution. It will be noted that this wall element substantially surrounds the storage chamber for holding the perishable product while the air flow passage used in accomplishing the freezing of the eutectic is disposed on the outside of the eutectic-containing wall. With this construction the product contained in the storage chamber is always subjected to a maximum cold wall exposure so that the most efficient heat transfer can take place, and yet, while cooling the product as here taught, it is protected on all sides against being exposed to abnormally low temperatures. The characteristic of the eutectic solution of maintaining a constant temperture while it is freezing makes this possible, and when the air passages 17 are used in a proper manner for freezing the eutectic, no damage can be done the product stored within the storage chamber because of undue temperature variations.

In normal operation a brine type of eutectic solution is preferably filled into the wall sections 16 so that a temperature of between 20° and 25° F. may be maintained in the storage compartment. This temperature has been found most satisfactory for the storing of most perishable food products for which this structure has been particularly provided.

Figure 5:
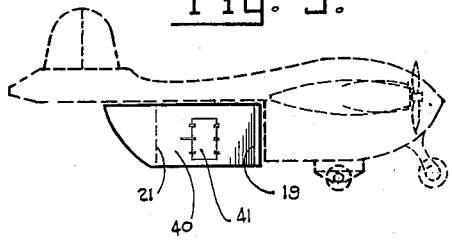
Figure 5 is a side elevation of an alternate form of the invention.

In Figure 5 a modified form of the invention is shown wherein a single van or a plurality of vans may be built in a shape such that when the van or vans are assembled with a plane, they form the fuselage thereof. As here shown, a single van 40 is provided having a door 41 to permit access thereto. The van is shaped to fit into the plane structure to, in effect, complete the fuselage of the plane, which is represented by the dotted outline.

The van 40 is constructed to have the same eutectic-containing walls 15 and 16, air scoops 20 and 21, and air flow passages 17, described above. The van 40 may be mounted in the plane structure in any appropriate manner.

When it is to be used, the van 40 may be loaded with a perishable product and fitted into its corresponding plane structure. The plane is then ready to take off and the van 40 is operative in a manner identical with that of the vans 10 described above. Upon reaching its destination, the van 40 may be disassembled from the plane and delivered to the consumer. The plane may then return as is or may have another van fitted into its structure for a return trip.

The above description relates to the preferred form of this apparatus. It is apparent that many modifications thereof will occur to those skilled in the art, which will fall within the scope of the following claims.

We claim:

1. A portable van structure for use in shipping perishable products, the van being adapted to be assembled into an airplane fuselage and comprising an outer insulated wall, an inner hollow wall surrounding the storage compartment, said hollow wall being adapted to contain an eutectic solution, air flow passage means between said insulated wall and said hollow wall, and means to divert a portion of the cold air normally flowing around the outsides of the airplane fuselage when the airplane is in flight into said passage means to accomplish a cooling of the van.

2. A portable van structure for use in shipping perishable products, the van being adapted to be assembled into an airplane fuselage and comprising a hollow wall surrounding the storage compartment, said hollow wall being adapted to contain an eutectic solution, an air flow passage means substantially surrounding said hollow wall, and means to divert a portion of the cold air normally flowing around the outside of the airplane fuselage when the airplane is in flight into said passage means to accomplish a cooling of the van.

3. A portable van structure for use in shipping perishable products, the van being adapted to be assembled into an airplane fuselage and comprising an outer insulated wall, an inner hollow wall surrounding the storage compartment, said hollow wall being adapted to contain an eutectic solution, air flow passage means between said insulated wall and said hollow wall, valve means in said flow passage means, and means to divert a portion of the cold air normally flowing around the outside of the airplane fuselage when the airplane is in flight into said passage means to accomplish a cooling of the van.

4. A portable van structure for use in shipping perishable products, the van being adapted to be assembled into an airplane fuselage and comprising an outer insulated wall, an inner hollow wall surrounding the storage compartment, said hollow wall being adapted to contain an eutectic solution, air flow passage means between said insulated wall and said hollow wall, said flow passage means having an inlet and an outlet, and means including an inlet scoop and a rearwardly turned hood over the outlet to the flow passage means to divert a portion of the cold air normally flowing around the outside of the airplane fuselage when the airplane is in flight into said passage means to accomplish a cooling of the van.

5. A portable van structure for use in shipping perishable products, the van being adapted to be assembled into an airplane fuselage and comprising an outer insulated wall, an inner hollow wall surrounding the storage compartment, said hollow wall being adapted to contain an eutectic solution, air flow passage means between said insulated wall and said hollow wall, means operable during at least a portion of a flight to divert a stream of cold air normally flowing around the outside of the airplane fuselage when the airplane is in flight into said passage means to accomplish a cooling of the van, means to produce a vacuum, and means to connect said vacuum means with said flow passage means when said diverting means is not in operation.

6. A portable van structure for use in shipping perishable products, the van being adapted to be assembled into an airplane fuselage and comprising an outer insulated wall, an inner hollow wall surrounding a generally rectangularly shaped storage compartment, said hollow wall being adapted to contain an eutectic solution, air flow passages between said insulated wall and said hollow wall, one of said passages passing around two sides of the wall around the storage compartment and the other passage passing around the other two sides of said wall, and means to divert a portion of the cold air normally flowing around the outside of the airplane fuselage when the airplane is in flight into said passages to accomplish a cooling of the van.

7. A portable van structure for use in shipping perishable products, the van being adapted to be assembled into an airplane fuselage and comprising an outer insulated wall, an inner hollow wall surrounding a generally rectangularly shaped storage compartment, said hollow wall being adapted to contain an eutectic solution, air flow passages between said insulated wall and said hollow wall, one of said passages passing around two sides of the wall around the storage compartment and the other passage passing around the other two sides of said wall, an air flow controlling valve means for said passages, and means to divert a portion of the cold air normally flowing around the outside of the airplane fuselage when the airplane is in flight into said passages to accomplish a cooling of the van.

BEVERLY E. WILLIAMS.
ALLAN R. REDROW.

REFERENCES CITED

The following references are of record in the file of this patent:

UNITED STATES PATENTS

| Number | Name | Date |
|---|---|---|
| 907,099 | Trowbridge | Dec. 15, 1908 |
| 1,369,367 | Thompson | Feb. 22, 1921 |
| 2,381,796 | Williams | Aug. 7, 1945 |
| 2,447,665 | Protzeller | Aug. 24, 1948 |
| 2,499,736 | Kleen | Mar. 7, 1950 |
| 2,501,898 | Haggerty | Mar. 28, 1950 |